May 8, 1928.
D. P. OWENS
1,669,345
TRACTOR
Filed July 17, 1923   4 Sheets-Sheet 1
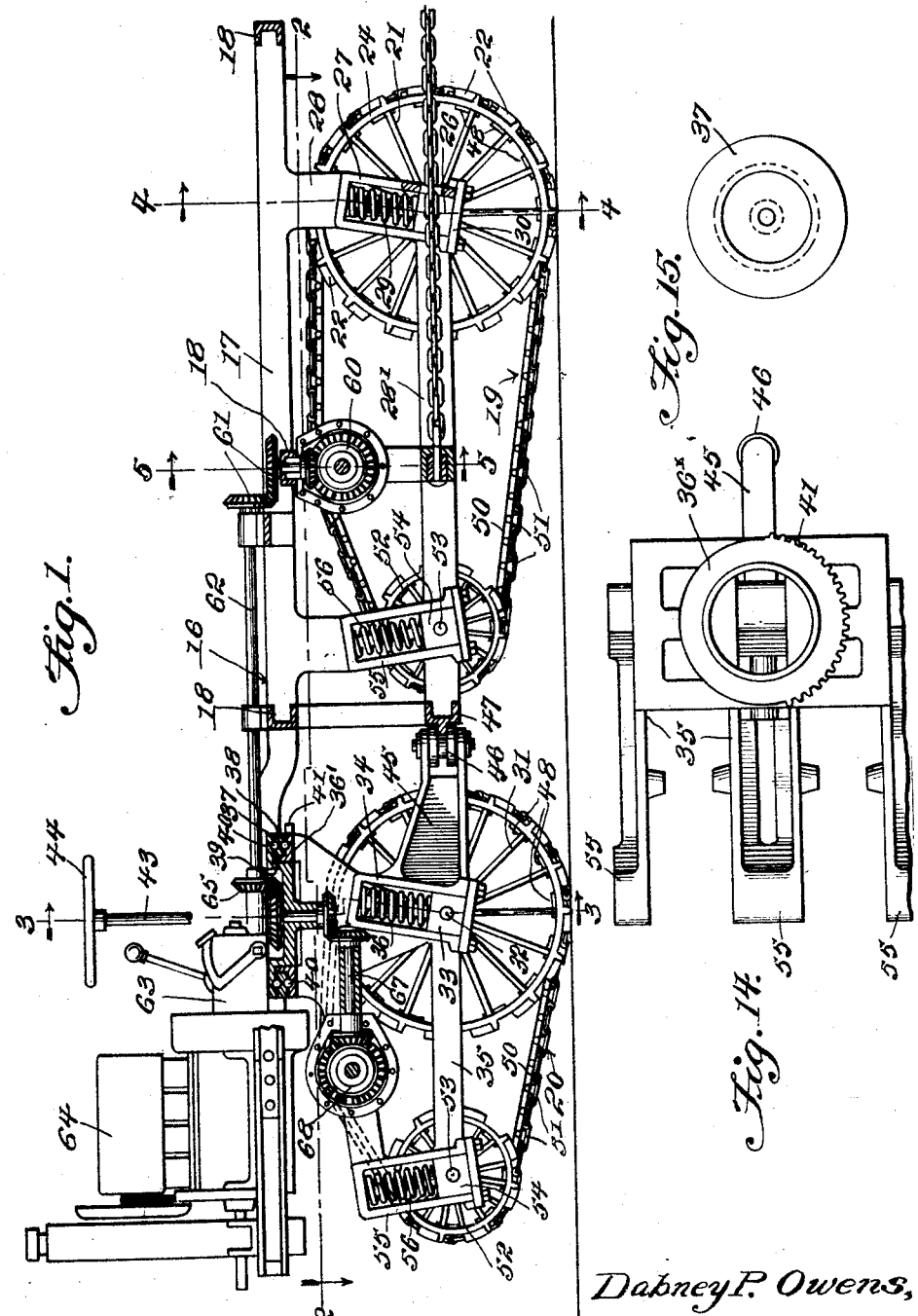
Dabney P. Owens,
INVENTOR
BY Victor J. Evans
ATTORNEY May 8, 1928.
D. P. OWENS
TRACTOR
Filed July 17, 1923 4 Sheets-Sheet 2
1,669,345
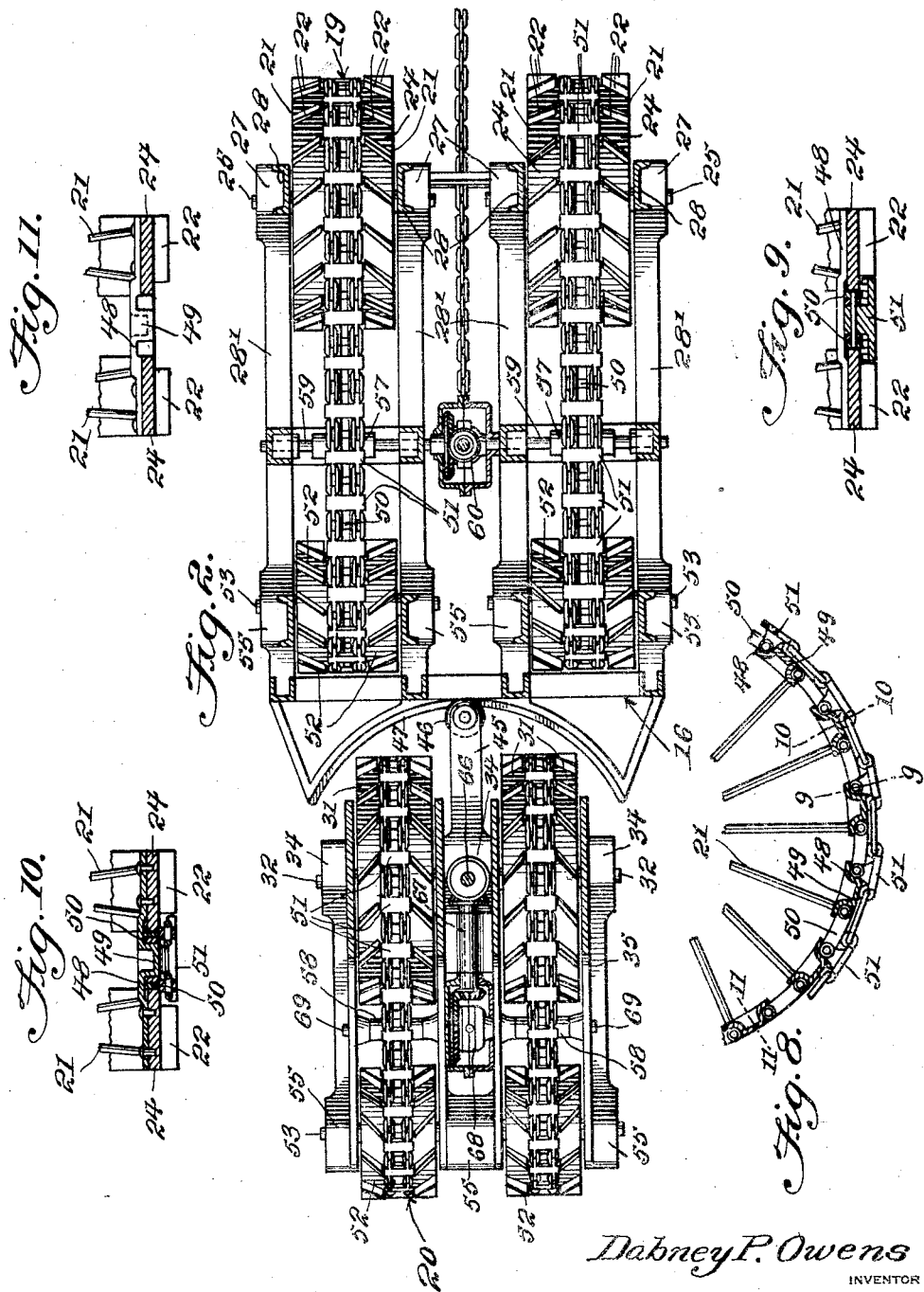
Dabney P. Owens
INVENTOR
BY Victor J. Evans
ATTORNEY
WITNESS:

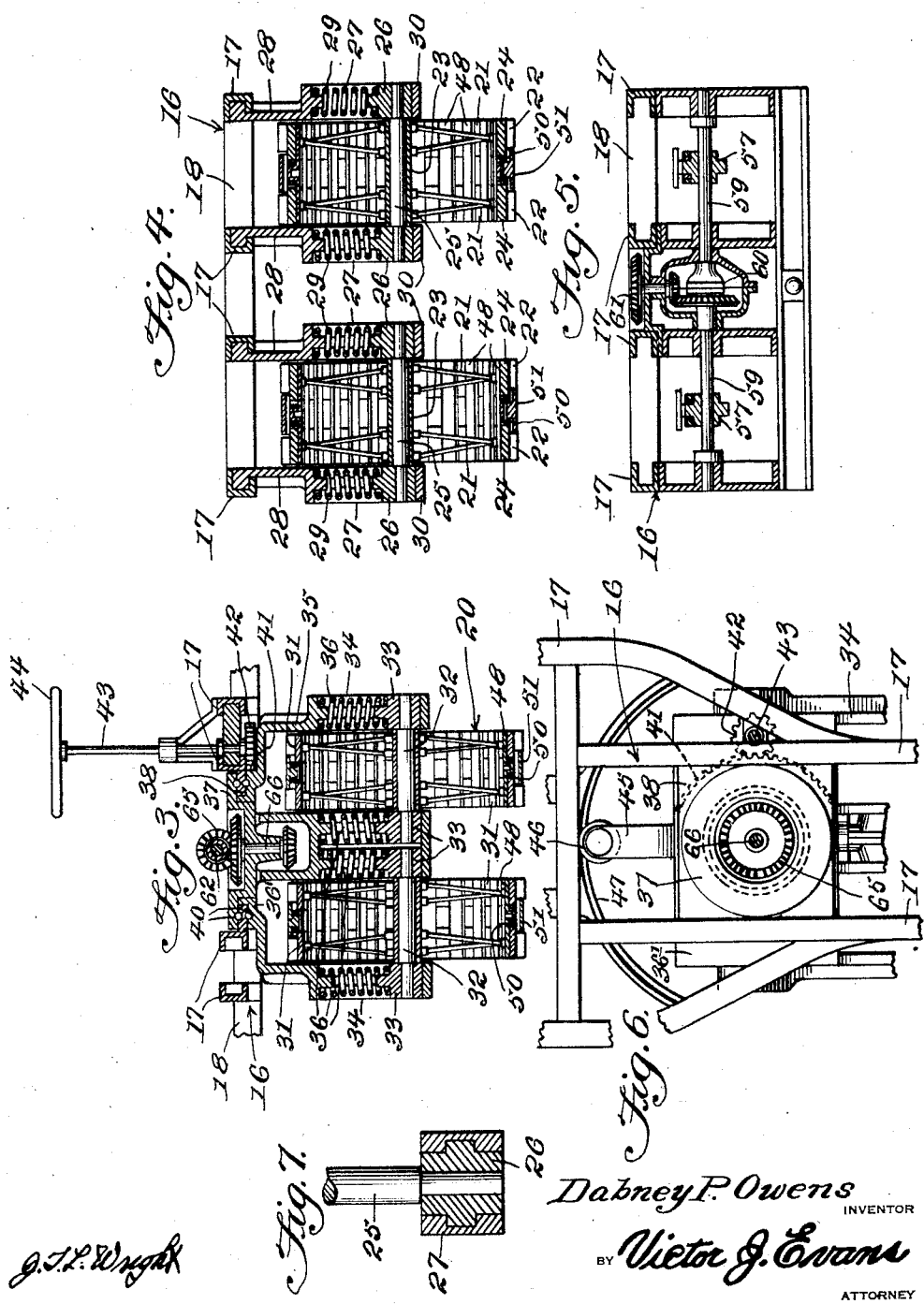

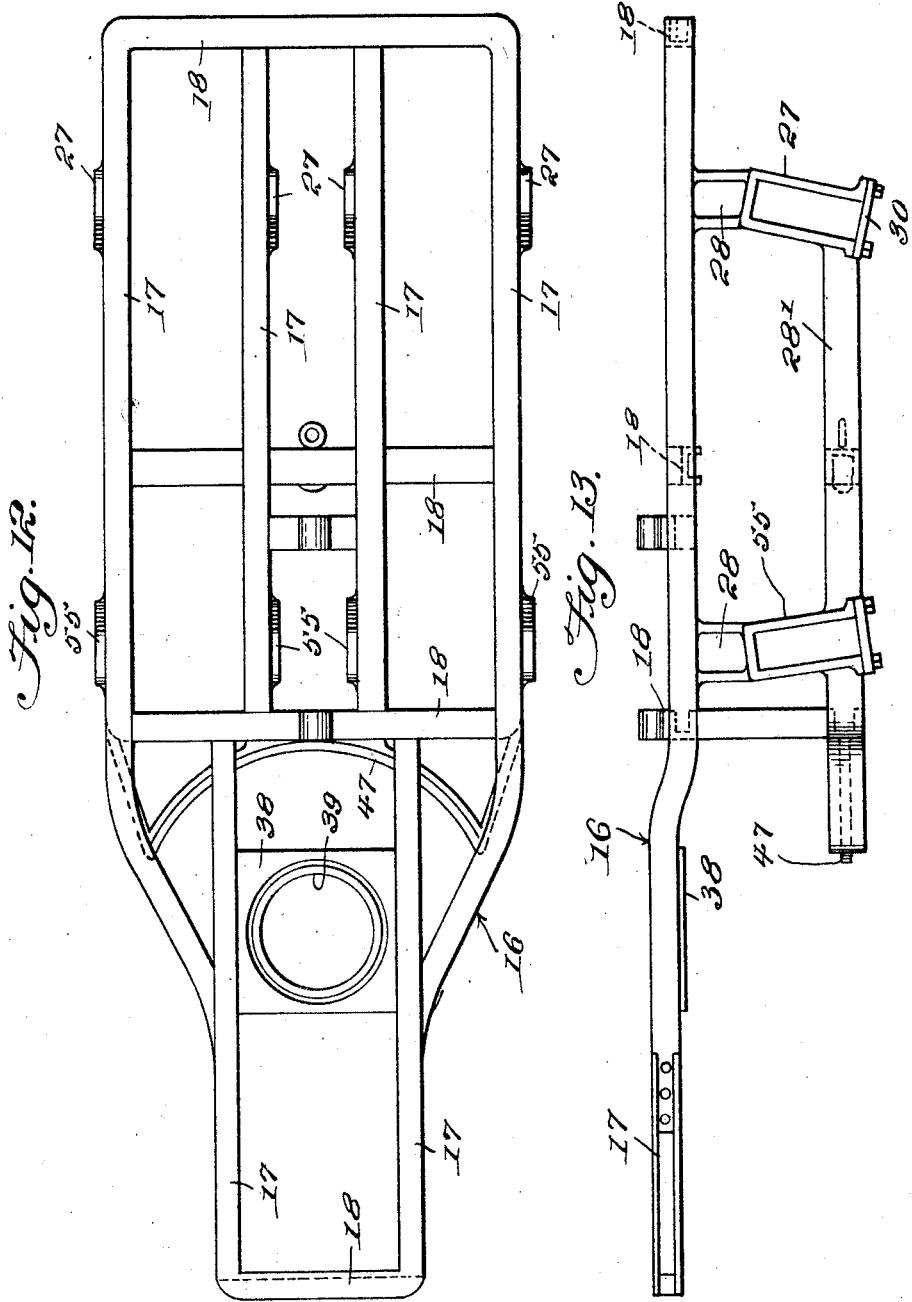

Patented May 8, 1928.

1,669,345

UNITED STATES PATENT OFFICE.

DABNEY P. OWENS, OF LAKE WORTH, FLORIDA.

TRACTOR.

Application filed July 17, 1923. Serial No. 652,153.

This invention relates to improvements in tractors and has for an object the provision of a machine which will include both a tractor and a truck so that a load may be hauled over good and bad roads with a minimum amount of danger of stalling through insufficient traction.

Another object of the invention is the provision of a tractor which is of relatively light construction, efficient and reliable in operation and which may be maneuvered in restricted spaces due to the arrangement for controlling its direction of travel.

Another object of the invention is the provision of a novel arrangement of traction elements, whereby the traction qualities thereof are increased in proportion to the soft or loose condition of the ground over which the machine is traveling.

With the above and other objects in view, the invention further includes the following novel features and details of construction, to be hereinafter more fully described, illustrated in the accompanying drawings and pointed out in the appended claims.

In the drawings:—

Figure 1 is a longitudinal sectional view of a combined tractor and truck constructed in accordance with the invention.

Figure 2 is a horizontal sectional view of the same.

Figure 3 is a transverse section taken substantially on the line 3—3 of Figure 1.

Figures 4 and 5 are similar views taken on the lines 4—4 and 5—5 respectively, of Figure 1.

Figure 6 is a fragmentary plan view of the forward portion of the main frame and a part of the steering mechanism.

Figure 7 is an enlarged detail section showing one of the compensating bearings.

Figure 8 is an enlarged fragmentary view of a portion of one of the tractor wheels.

Figures 9, 10 and 11 are enlarged detail sectional views taken respectively on the lines 9—9, 10—10 and 11—11 of Figure 8.

Figure 12 is a detail plan view of the main frame.

Figure 13 is a side view of the same.

Figure 14 is a detail plan view of the front traction unit frame.

Figure 15 is a detail plan view of the fifth wheel cap.

Referring to the drawings in detail wherein like characters of reference denote corresponding parts, the invention as illustrated in the drawings includes a main frame which is designated generally at 16. This main frame includes spaced parallel bars 17 and transverse bars 18.

The frame is supported by rear traction elements 19 and a front traction unit 20, the former including spaced pairs of traction wheels 21 having traction blocks or similar devices 22 spaced around their peripheries. Each pair of traction wheels 21 includes a common hub 23 which is connected to the separate wheel rims 24, preferably by means of light spokes so as to reduce weight. Each pair of traction wheels 21 is mounted upon a separate axle 25 and the latter is in turn mounted in movable bearings 26. The bearings 26 are movable in guides 27 which are carried by bolsters 28 depending from the main frame 16 and the guides 27 are connected by spaced longitudinally disposed bars 28'. Springs 29 serve to force the bearings 26 downward to the lower ends of the guides and into engagement with removable plates 30.

The front traction unit 20 also includes spaced pairs of traction wheels 31, whose construction is similar to the wheels 21 previously described and like these wheels 21, the wheels 31 are mounted upon axles 32 whose movable bearings 33 operate in guides 34 carried by the frame 35 of the front traction unit. The bearings 33 are forced downward by springs 36.

The front traction unit is pivotally secured beneath the forward end of the main frame 16 and for this purpose there is provided a fifth wheel. This wheel includes an annular transversely L-shaped bearing plate 36' and a relatively rigid cap 37 which receive between them a plate 38 which is carried by the main frame 16 and which is provided with an opening 39 to receive the cap and an annular flange which extends upwardly from the bearing plate 36'. Anti-friction devices 40 are provided whereby the traction unit 20 may freely rotate.

Extending from the plate 36' are teeth 41 which are engaged by a pinion 42 and this pinion is secured to the lower end of a steering post 43 which is surrounded by a steering wheel 44. Thus the front traction unit 20 may be moved pivotally to control the direction of travel of the tractor.

Extending rearwardly from the frame 35 is an arm 45 which carries at one end a grooved wheel 46 and this wheel receives a curved flange 47 which is located at the forward end of the main frame of the machine.

Each pair of traction wheels 21 and 31 is connected by transversely arranged spaced plates 48, the latter being provided with offset portions or teeth 49 which engage the links of a chain 50. One of these chains is provided between each pair of traction wheels. The chains 50 are provided with traction plates 51 which, as shown in the drawings, are located between and are substantially flush with the traction blocks 22.

The chains 50 extend upwardly and forwardly around idlers 52 which are mounted upon shafts 53 at the forward ends of both the front and rear chains. The shafts 53 like the axles 25 and 32 are mounted in movable bearings 54 which operate in guides 55 and which are normally forced downward by springs 56. The chains 50 pass over driving sprockets 57 and 58 which operate respectively the rear and front traction chains.

In order to compensate for the upward movement of the movable bearings against the action of their springs and prevent looseness of the traction chains 50, the guides for these movable bearings are relatively inclined, so that as the lower flights of the chains move upward, the length of the loops will be increased proportionately so that the chains will always remain of the proper tightness to insure the desired traction.

The rear sprockets 57 are mounted upon aligned shafts 59 and these shafts are connected by a differential mechanism 60 which is driven by means of beveled gears 61 from a drive shaft 62. The shaft 62 extends longitudinally of the machine and is operated by a suitable transmission mechanism located within a housing 63 operated by an engine 64 or other source of power.

The shaft 62 is connected by means of gears 65 with a short shaft 66 which extends downwardly through the fifth wheel cap 37. The shaft 66 is geared to the forward drive shaft 67 and the latter is in turn geared to a differential mechanism 68. The differential mechanism 68 operates aligned shafts 69 upon which are mounted the sprockets 58, the said sprockets engaging the traction chains of the front traction unit 20 for their operation.

It will be apparent from the foregoing description and accompanying drawings that the invention provides a tractor which is of relatively light construction and which due to the construction and mounting of the front axle unit may be maneuvered in restricted places. Further, the construction and arrangement of the traction elements is such that when soft and muddy ground is encountered, the amount of traction will be increased in proportion to the amount the traction elements sink into the ground. This is due to the inclined arrangement of the chains. Further, by arranging the wheel rims in spaced pairs as shown and connecting these rims in the manner described, mud or clay soil will be forced upward between the connecting bars 48 so as to prevent clogging of the wheels. A truck or other body may be mounted upon the main frame and the machine used for trucking, so that heavy loads may be transported over bad roads and danger of stalling due to the soft or sandy condition of the roads will be reduced to a minimum.

The invention is susceptible of various changes in its form, proportions and minor details of construction and the right is herein reserved to make such changes as properly fall within the scope of the appended claims.

Having described the invention what is claimed is:—

1. A tractor comprising a main frame, spaced longitudinally disposed upwardly and forwardly inclined rear traction elements supporting the rear end of the main frame, a forwardly and upwardly inclined front traction unit, said unit including a frame, spaced wheel carried traction elements connected with the traction unit frame, means pivotally connecting the traction unit frame and main frame at a point spaced above the traction unit frame to permit of relative horizontal pivotal movement, means whereby the traction unit frame may be moved pivotally, means for controlling such pivotal movement, reinforcing means carried by the traction unit frame, guiding means extending forwardly from the main frame on substantially the same horizontal plane with the axis of the wheels of the traction elements, and means carried by the reinforcing means of the traction unit frame and movably engaging the forwardly extending guiding means of the main frame.

2. A tractor comprising a main frame, spaced longitudinally disposed upwardly and forwardly inclined rear traction elements, an upwardly and forwardly inclined front traction unit, said unit including a frame, spaced wheels supporting the frame and traction elements carried by the wheels, means pivotally connecting the traction unit frame and main frame at a point spaced above the traction unit frame to permit of relative horizontal movement, an arm extending from the traction unit frame, an arcuate track carried by the main frame for engagement by the said arm, said arm and track being located upon substantially the same horizontal plane with the axis of the wheels of the traction elements, means whereby the traction unit frame may be moved pivotally and means for driving the traction elements.

3. In a tractor, a main frame, a rear frame, a front pivotally movable frame having a centrally located opening and an annular transversely L-shaped member surrounding the opening, said member extending into an opening provided in the rear frame, a cap, a centrally located annular shoulder included in the cap and extending into the opening of the pivotally movable frame to provide a bearing, and means engaging the pivotally movable frame to rotate the latter and control the direction of travel of the tractor.

In testimony whereof I affix my signature.

DABNEY P. OWENS.